(12) United States Patent
Kladar et al.

(10) Patent No.: US 6,226,162 B1
(45) Date of Patent: May 1, 2001

(54) SURGE SUPPRESSION NETWORK RESPONSIVE TO THE RATE OF CHANGE OF POWER DISTURBANCES

(75) Inventors: Dalibor Kladar; Chi Thuong Ha; Anthony Cernan Mendoza; James Funke, all of Calgary (CA)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/324,417

(22) Filed: Jun. 2, 1999

(51) Int. Cl.[7] ........................................... H02H 3/20
(52) U.S. Cl. .......................... 361/56; 361/111; 361/54
(58) Field of Search ........................... 361/54.56, 111, 361/93.1, 93.9, 100, 117, 126, 127, 131, 120

(56) References Cited

U.S. PATENT DOCUMENTS

| 3,947,726 | 3/1976 | DeCecco et al. . | |
|---|---|---|---|
| 4,288,830 | * 9/1981 | Brasfield | 361/56 |
| 4,321,644 | * 3/1982 | Brasfield | 361/56 |
| 4,322,767 | * 3/1982 | Hamamsy et al. | 361/56 |
| 4,563,720 | 1/1986 | Clark . | |
| 4,571,656 | 2/1986 | Ruckman . | |
| 4,587,588 | * 5/1986 | Goldstein . | |
| 4,628,398 | 12/1986 | Cook . | |
| 4,631,621 | 12/1986 | Howell . | |
| 4,695,916 | 9/1987 | Satoh et al. . | |
| 4,912,589 | * 3/1990 | Stolarczyk | 361/56 |
| 5,157,572 | 10/1992 | Bird . | |
| 5,617,288 | * 4/1997 | Zaretsky | 361/127 |
| 5,621,599 | 4/1997 | Larsen et al. . | |
| 5,646,810 | 7/1997 | Funke . | |
| 5,781,393 | 7/1998 | Tabib-Azar et al. . | |
| 5,784,236 | 7/1998 | Tardiff et al. . | |

* cited by examiner

*Primary Examiner*—Michael J. Sherry
*Assistant Examiner*—Kim Huynh
(74) *Attorney, Agent, or Firm*—Martin J. Moran

(57) ABSTRACT

A surge suppression network for single and multiphase ac systems has a voltage clamping device connected in series with a gated crowbar device across the supply voltage in parallel with the load to be protected. A trigger circuit gates the crowbar device on in response to a specified rate of change of the supply voltage indicative of a surge. For higher levels of surge current shunting, pluralities of clamping devices and crowbar devices can be connected in parallel with a single trigger circuit simultaneously turning on all of the crowbar devices for each phase. For crowbar devices such as TRIACs with different response characteristics to positive and negative surges and for unipolar devices such as SCRs, positive and negative subnetworks are connected in anti-parallel across the load.

28 Claims, 6 Drawing Sheets

SURGE SUPPRESSION NETWORK RESPONSIVE TO THE RATE OF CHANGE OF POWER DISTURBANCES

BACKGROUND OF THE INVENTION

1. Field of the Invention

This invention relates generally to apparatus for protecting a facility and its loads from surges in supply voltage, and more particularly, to a surge suppression network responsive to a rate of change in supply voltage indicative of a surge to clamp the voltage across the load to a specified voltage level.

2. Background Information

Various devices and arrangements are known for protecting loads from surges in supply voltage. Generally, two approaches are used: Series and parallel protection. In series protection, a high impedance is used in series with the load during a surge to block or limit surge current. In parallel protection, the surge current is diverted with a low impedance shunt. The present invention provides parallel protection.

It is known to use voltage clamping devices and crowbar devices to provide parallel surge protection. The voltage clamping devices clamp the voltage across the load to a specified level. A common type of clamping device is the metal oxide varistor (MOV). If used alone to provide parallel protection, the MOV must have a clamping voltage that is substantially above the nominal supply voltage so that its maximum continuous operating voltage (MCOV) is above the nominal supply voltage. Known crowbar devices include gas discharge tubes and thyristors. These devices normally have a high impedance and switch to a low impedance when a surge in the supply voltage exceeds the breakdown voltage of the gas in the case of the gas discharge tube, or is high enough to activate a trigger circuit to turn the thyristor on. A major difficulty with gas discharge tubes is that they are difficult to turn off even when the voltage goes through zero. An inherent limitation of the crowbar devices when used alone is that the low impedance that they switch into parallel with the load, depresses the load voltage below nominal.

U.S. Pat. No. 4,912,589 suggests a surge suppression network in which a clamping device such as a MOV is connected in series with a crowbar device in the form of a gas tube or a trigger device such as a silicon controlled rectifier (SCR) or a TRIAC. A triggering circuit in parallel with the clamping device switches the crowbar device when a surge exceeds a breakdown or trigger voltage. Thus, this network is responsive to the amplitude of the voltage surge.

U.S. Pat. No. 5,621,599 discloses a parallel protection circuit described as a "switched MOV device." In this network, an MOV is connected in series with a TRIAC across the load. The TRIAC is triggered on by a voltage applied to the gate by a resistor network so that again, the network is voltage responsive.

A limitation of these known protection circuits utilizing crowbar devices, in addition to the difficulty in turning them off, is that they are relatively slow to respond. Also, the known parallel surge suppression networks which respond to voltage are intentionally triggered by harmonics and/or temporary over-voltage disturbances.

There is a need for an improved surge suppression network. This includes a need for a surge suppression network that does not respond to harmonics or temporary over-voltage disturbances.

There is also a need for an improved surge suppression network incorporating MOVs as clamping devices which does not require an MCOV well above the nominal supply voltage.

SUMMARY OF THE INVENTION

These needs and other needs are satisfied by the invention which is directed to a surge suppression network responsive to the rate of change of the amplitude rather than the amplitude of the supply voltage. This improved surge suppression network being immune to line voltage, is not triggered by electrical noise, harmonic and/or temporary overvoltage disturbances. It is ON only when a high dV/dt transient disturbance is present. In the absence of these transient disturbances, the network hibernates.

The improved surge suppression network includes: a voltage clamping means for limiting voltage thereacross to a specified clamping voltage; a crowbar means switchable from a current blocking off state to a current conducting on state in response to a trigger signal; and a trigger means connected to the supply voltage and the crowbar means to generate the trigger signal for the crowbar means in response to a specified rate of change in amplitude of the supply voltage. The crowbar means and the voltage clamping means are connected in series across the ac mains and in parallel with the facility power distribution system and load. The trigger signal switches the crowbar means to the on and off state. The crowbar means is selected from a group comprising a TRIAC, a silicon controlled rectifier (SCR), and a four-terminal thyristor. Preferably, the trigger means is a series resistor, capacitor circuit connected to the gate electrode of the crowbar means. Preferably, the voltage clamping means is selected from a group comprising a metal oxide varistor, a zener diode and a silicon avalanche diode.

For heavier duty applications, the voltage clamping means comprises a plurality of voltage clamping devices connected in parallel and the crowbar means similarly comprise a plurality of crowbar devices connected in parallel. A common RC trigger circuit is provided for all of the crowbar devices.

Where the crowbar means, such as a TRIAC, exhibits a faster turn-on characteristic in one direction, and in the case of unipolar crowbar devices such as SCRs, the surge suppression network can comprise a positive subnetwork and an anti-parallel negative subnetwork each having clamping means, crowbar means, and an associated trigger means providing a trigger signal to the crowbar means in response to the specified rate of change in the supply voltage. The positive and negative subnetworks can also have a plurality of parallel connected clamping devices, and parallel connected crowbar devices in series with the plurality of clamping devices, and each subnetwork can have its own common trigger circuit.

In the embodiments of the invention having a plurality of crowbar devices, it is preferred to have impedances that have matched inductance and minimum tolerance in series with the crowbar devices to help to equalize the current through the parallel devices. These impedances preferably introduce some inductance into series with the crowbar devices to assist in equalization of current. In an exemplary embodiment of the invention, these impedances are fuses or fuse resistors which provide some series inductance. The voltage clamping devices are shunted by a resistor having a much lower resistance than the clamping devices to reduce the voltage across these devices. This permits the surge suppression network to be used over the full range of voltages (e.g., 100 to 600 VAC) typically utilized in low voltage systems.

For multiphase supply voltages, associated voltage clamping means in series with crowbar means and trigger means for the crowbar means are provided for each of the phases of the supply voltage. Where the supply voltage also includes a neutral and a ground, associated voltage clamping means in series with crowbar means and trigger means responsive to the rate of change of voltage are also provided between the neutral and ground. As in the case of the single phase systems, these multiphase systems can have pluralities of voltage clamping devices and crowbar devices served by a common trigger circuit for each phase, and for neutral to ground if provided.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
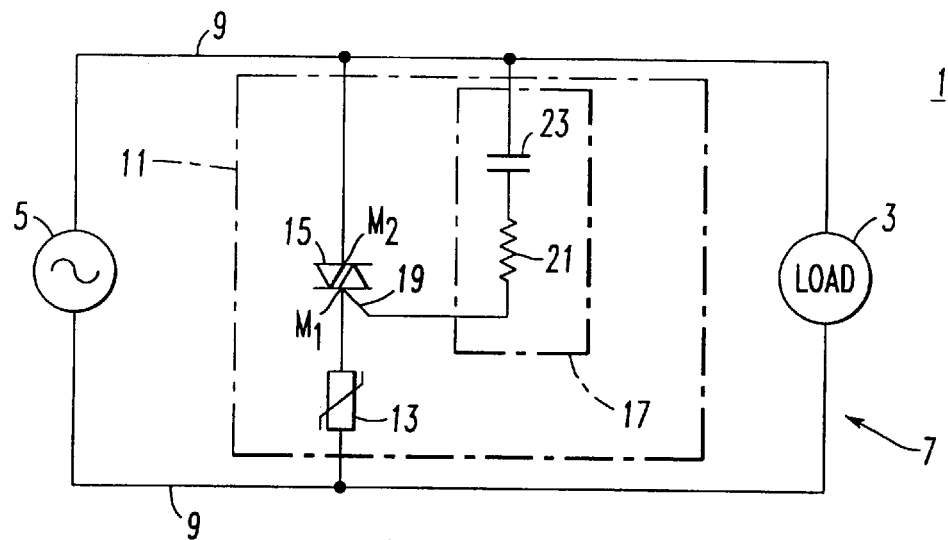
FIG. 1 is a schematic diagram of a basic implementation of the invention.

FIG. 1 illustrates application of the invention to an electrical system 1 in which a load 3 or an entire facility including a number of loads 3 is powered by an ac voltage source 5 through a distribution system 7 including the conductors or mains 9. In order to protect the load 3 from surges, a basic embodiment of the surge protection network 11 in accordance with the invention is connected in parallel across the load. This basic form of the surge suppression network 11 includes a clamping device 13 connected in series with a crowbar device 15. In the exemplary circuit of FIG. 1, the clamping device 13 is a metal oxide varistor (MOV) and the crowbar device 15 is a TRIAC. A trigger circuit 17 is connected to the gate 19 of the TRIAC and is responsive to the rate of change of the supply voltage (dV/dt). The preferred form of the trigger circuit 17 responsive to dV/dt is a series circuit made up of resistor 21 and capacitor 23. As the TRIAC 15 is only turned on in response to a dV/dt of a surge, the surge suppression network 11 is immune to electrical noise, and harmonic and/or temporary overvoltage disturbances. While there is some leakage through the trigger circuit 17, this leakage current is very low and hence, the MOV does not need to have a high maximum continuous operating voltage (MCOV) as in other surge suppression networks. In fact, the MCOV of the MOV 13 in FIG. 1 can be lower than the RMS supply voltage.

Figure 2:
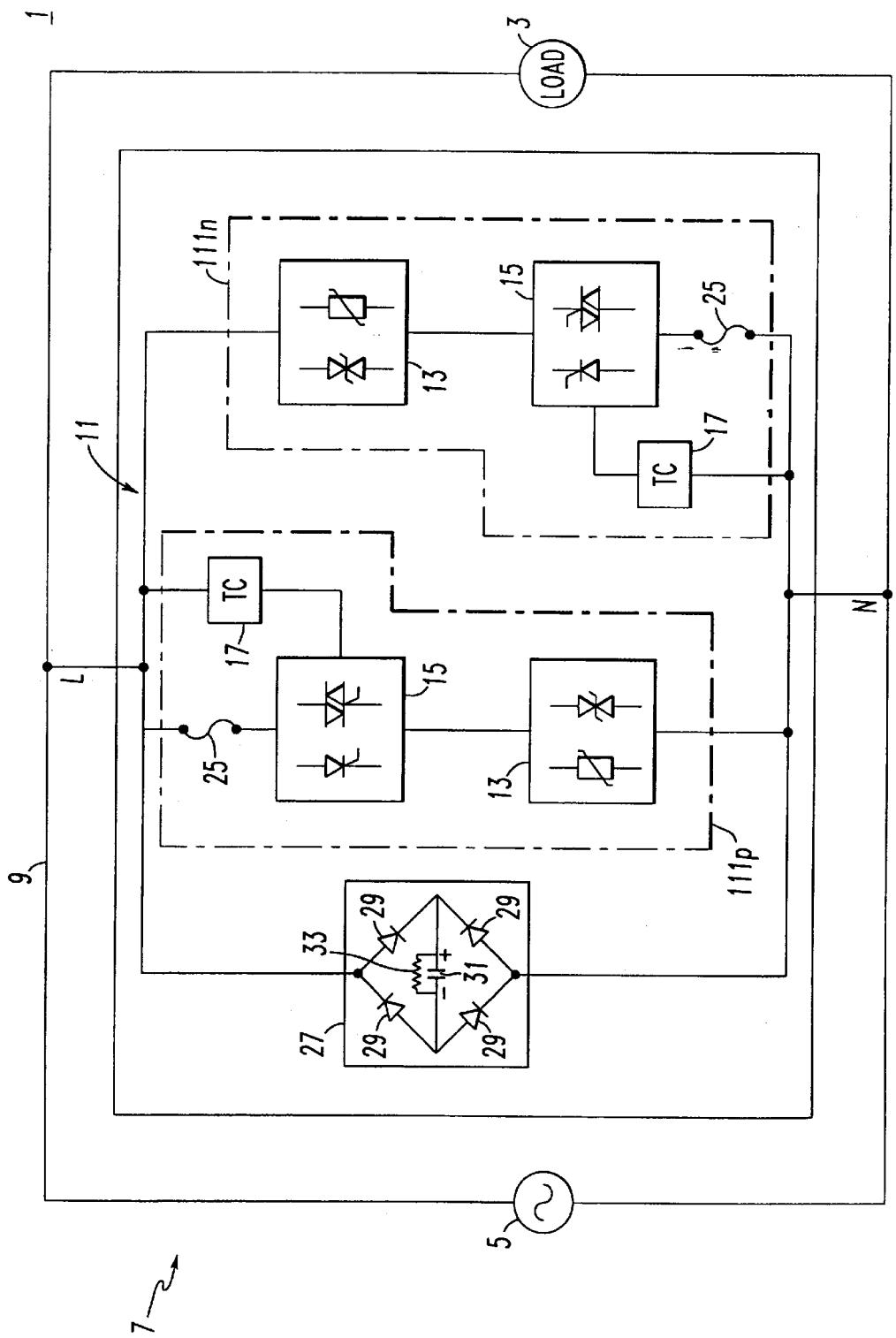
FIG. 2 is a schematic circuit diagram of another embodiment of the invention.

Of course, the surges can be either bi-directional oscillations or unidirectional impulses occurring in either direction. The MOV 13 is bi-directional. The TRIAC 15 is also bi-directional; however, as is known, the TRIAC responds faster when the polarity of the signal is such that the main terminal $M_2$ and gate terminal are positive with respect to main terminal $M_1$. Accordingly, an embodiment of the surge suppression network which is more preferable is shown in FIG. 2. In this embodiment, the surge suppression network 11 includes a positive subnetwork $11_p$ and a negative subnetwork $11_n$ connected in anti-parallel. Each subnetwork $11_p$ and $11_n$ includes the clamping device 13, crowbar device 15 and a trigger circuit 17 for the crowbar device. The clamping device 13 may be an MOV, but could also be for instance a zener diode or a silicon avalanche diode (SAD). Similarly, the crowbar device 15 could be a TRIAC, or for instance, could be an SCR or a four-terminal thyristor. The trigger circuit (TC) 17, which may be a series resistor capacitor circuit as in FIG. 1, for the positive subnetwork $11_p$ is connected between the upper conductor 9 and the gate of the associated crowbar device 15. Similarly, the trigger circuit (TC) 17 for the negative subnetwork $11_n$ is connected between the lower conductor 9 and the gate of the associated crowbar device 15.

In the embodiment of the surge suppression network shown in FIG. 2, the subnetwork with the same polarity as the surge will turn on first. Shortly after, the subnetwork of the opposite polarity will turn on. The timing of this event is such that most of the surge current (more than 90%) is shared between the two subnetworks regardless of surge polarity. Inductive fuses 25 connected in series either before or after the crowbar components 15 provide for better surge current sharing and limit the fault current should the clamping and/or crowbar devices fall short. Since the inductive properties of the fuses are the same, current sharing is improved.

The surge suppression network 11 of FIG. 2 further includes a diode to energy storage to dissipation (DESD) circuit 27 in parallel with the subnetworks $11_p$ and $11_n$ across the load 3. This DESD circuit 27 is described in U.S. Pat. No. 5,646,810 which is hereby incorporated by reference. The circuit 27 includes anti-parallel pairs of serially connected diodes 29 with a capacitor 31 connected across the midpoints of the diode pairs and with a discharge resistor 33 connected in shunt with the capacitor 31. This low energy circuit reduces the noise and also reduces the sharp edges of the surges.

The surge suppression network 11 of the invention has been designed using three distinct protection principles: 1) the circuit should turn on (conduct current) during short duration surges due to a change in dV/dt, 2) the circuit should not be damaged by temporary over-voltages, and 3) the circuit should provide protection against positive and negative surges. These three protection principles are accomplished by using the crowbar devices 15 and clamping devices 13 connected in series. The result is lower total dynamic impedance than possible with conventional surge suppression networks using clamping components such as MOVs and/or SADs. The crowbar component 15 is immune to line voltage and reacts only if the changes in dV/dt are of sufficient magnitude. This operating feature allows for isolating the clamping component 13 from the line voltage and enables the use of clamping devices 13 with MCOV ratings lower than the line voltage of the electrical system. It is the use of low MCOV clamping components that reduces the surge suppression network's dynamic impedance and results in clamping voltages lower than possible with conventional surge protection networks.

Both the crowbar devices 15 and clamping devices 13 turn on at the same time and change the total impedance of the branch from a very high value during the non-conducting stage to less than one ohm during the conductive stage. Compared to the same class of surge protection networks, wherein only MOVs or SADs are used, the surge protection network 11 of the invention has a dynamic impedance which is far lower and a clamping voltage which is vastly superior. For example, a 50V MCOV MOV (20 mm) and a 150V MCOV MOV (20 mm) have the same surge current capability, but the 50V MCOV MOV has lower clamping voltage. Dynamic impedance is defined as the ratio of the clamping voltage and surge current at a given point in time. An MOV is a non-linear component. Dynamic impedance is used to describe that non-linearity. Naturally, a 50V MCOV MOV has a lower clamping voltage compared to a 150V MCOV MOV. As such, a 50V MCOV MOV has a lower dynamic impedance.

The amplitude, duration and rate-of-rise of a surge are a function of the electrical system wiring and the magnitude of the surge energy. Once a surge enters a facility, the natural resonance and impedance of the electrical distribution system will result in a damped oscillatory surge with natural frequencies ranging from 30 kHz to 1.5 MHz. The fast rise and high frequency range result in high dV/dt changes.

From this point on for the preferred embodiment, the crowbar component within the surge suppression network will be considered to be a TRIAC, and the clamping component an MOV. The same general conclusions apply when other types of crowbar and/or clamping components such as, for example, SCRs and SADs, respectively, are used.

The withstand capability of a TRIAC against a fast rising surge is called static dV/dt or $dV/dt_s$. If during a surge, the dV/dt is higher then the $dV/dt_s$ characteristic of the TRIAC, the surge suppression network 11 will turn on and conduct large levels of surge current (several kA per MOV/TRIAC).

For example, a sine wave (VAC=120 VAC, 60 Hz) has the following maximum dV/dt value:

$$(dV/dt)^{SIN}=2*\pi*f*V_{PEAK}=2*\pi*f*V_{RMS}*1.4[V/\mu s] \quad \text{Equation (1)}$$

$$(dV/dt)^{SIN}=0.64[V/\mu s] \quad \text{Equation (2)}$$

The value of $(dV/dt)^{SIN}$ changes with time as follows:

$$(dV/dt^{SIN}(t)=0.64*\text{cosine}(2*\pi*f*t)[V/\mu s]=0.64*\text{cosine}(\alpha)[V/\mu s] \quad \text{Equation (3)}$$

The table below presents several values of $(dV/dt)^{SIN}(t)$ at different phase angles α for 120 VAC, 240 VAC and 480 VAC systems.

| Time (ms) | α degrees | 120 VAC (dV/dt) (V/us) | 240 VAC (dV/dt) (V/us) | 480 VAC (dV/dt) (V/us) |
|---|---|---|---|---|
| 0 | 0 | 0.64 | 1.28 | 2.56 |
| 1.4 | 30 | 0.55 | 1.10 | 2.20 |
| 2.1 | 45 | 0.45 | 0.90 | 1.80 |
| 2.8 | 60 | 0.32 | 0.64 | 1.28 |
| 8.3 | 90 | 0 | 0.00 | 0.00 |

In order to understand these numbers in the context of the surge suppression network of the invention, it is important to look at the dV/dt characteristic of a surge. For the standard $C_1$ test surge defined by IEEE (6 kV, 1.2/50 µs; 3 kA, 8/20 µs) the max dV/dt value is:

$$(dV/dt)^{C1}=(1-1/e)*V_{PEAK}/(t_2-t_1)=0.63*V_{PEAK}/(t_2-t_1)=0.063*6000/(0.391-0.042)[V/\mu s] \quad \text{Equation (4)}$$

$$(dV/dt)^{C1}=1319[V/\mu s] \quad \text{Equation (5)}$$

Where $t_1$ equals 10% of the surge voltage peak or 0.042 µs and $t_2$ equals 63% of the surge voltage peak or 0.391 µs.

The standard UL surge, (defined as 6 kV, 1.2/50 µs; 500 A, 8/20 µs), has the same maximum value for dV/dt as the IEEE $C_1$ surge $$(dv/dt)^{UL}=1319[V/\mu s]. \quad \text{Equation (6)}$$

The IEEE $C_3$ surge, (20 kV, 1.2/50 µs; 10 kA, 8/20 µs), has a maximum dV/dt of:

$$(dV/dt)^{C3}=4400[V/\mu s]. \quad \text{Equation (7)}$$

The static dV/dt characteristic of the TRIAC 15 can be specified by adjusting the gate triggering circuit. It should be adjusted to be much higher than $(dV/dt)^{SIN}$ but less than $(dV/dt)_{C1}$. This allows for use of MOVs with a lower MCOV than the electrical system line voltage.

The TRIAC 15 will always operate within the avalanche zone due to the high dV/dt (high frequency and duration) of the surge. The MOV 13 responds faster than the TRIAC. The MOV completely turns on in 5 to 25 ns, while the TRIAC requires 300 to 700 ns to be on fully. However, the TRIAC impedance changes as the MOV turns on and starts to remove the surge within 5 to 25 ns, the same time frame required to turn on the MOV.

The TRIAC 15 response depends on:

the polarity of the surge applied to the TRIAC, the trigger current peak and duration, the number of TRIACs connected in parallel, and the parasitic capacitance of the MOV (due to fast rising leakage current).

The TRIAC 15 will turn off when the main current (MT2–MT1) is close to zero. First, the MOV 13 in series with the TRIAC turns off as the voltage across it drops to below its clamping voltage. The MOV impedance increases (MΩ) and the current flowing through it is reduced almost to zero. Since the MOV and TRIAC are in series, the main terminal current through the TRIAC also has a near zero value and the TRIAC turns off.

To achieve current ratings higher than those permitted by one large TRIAC, it is common practice to connect TRIACs in parallel. Parallel operation can offer some additional advantages. Losses are more evenly distributed, allowing for better cooling. In addition, redundant TRIACs increase the surge suppression network's operational reliability and life expectancy.

Figure 3:
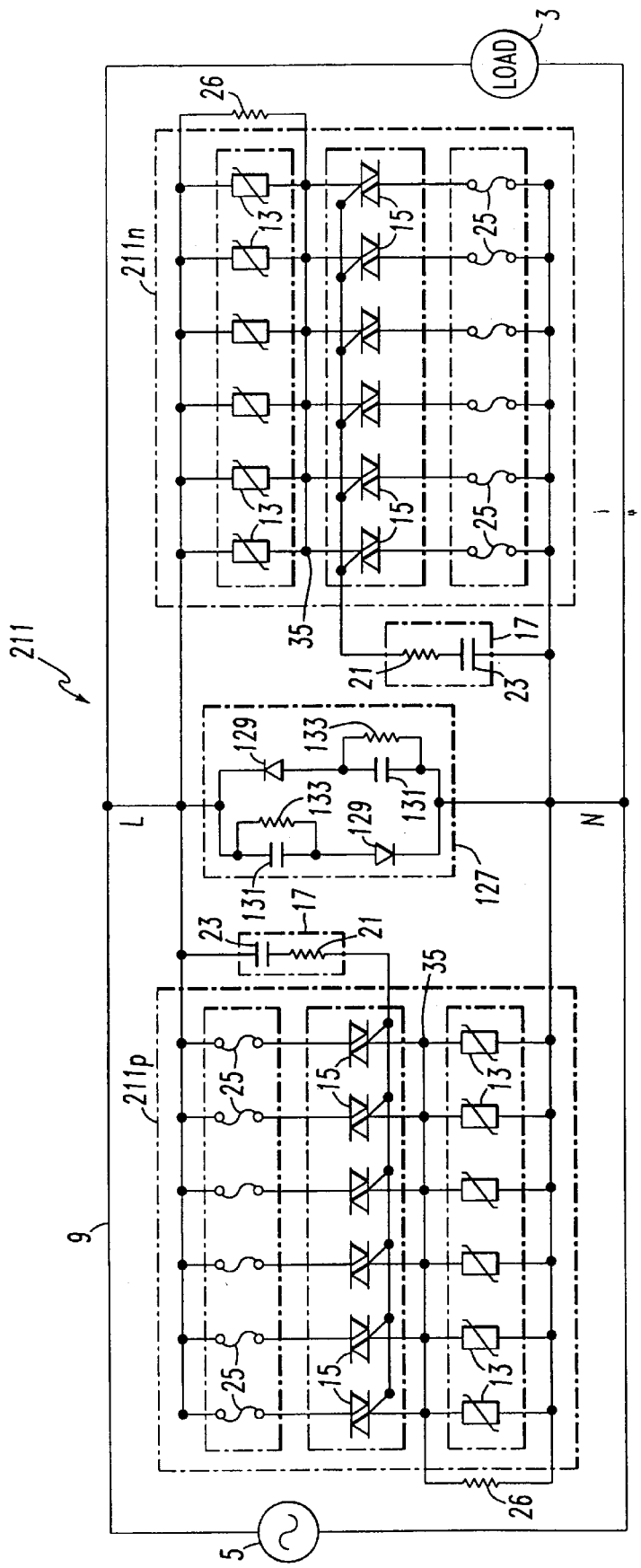
FIG. 3 is a schematic diagram of yet another embodiment of the invention.

FIG. 3 illustrates a surge protection network 211 in accordance with the invention suitable for higher current ratings. In this embodiment, a plurality of TRIACS 15 are connected in parallel in each of the subnetworks $211_p$ and $211_n$. At the same time, each of the subnetworks $211_p$ and $211_n$ has a plurality of MOVs 13 connected in parallel. The parallel connected TRIACS 15 are connected in series with the associated MOVs 13 by the connection 35. This increases the surge current capability of the surge suppression network. It also results in a faster response time than possible with a single TRIAC/MOV because the total impedance of parallel connected TRIACs/MOVs is reduced as more are grouped within a subnetwork. The plurality of fuses 25 connected in series with an associated TRIAC in each subnetwork further improves current sharing. In order to achieve synchronized action of all of the TRIACs 13 within a subnetwork, a common triggering circuit 17 triggers all of the TRIACs in a subnetwork simultaneously. Preferably, the MOVs 13 are shunted by a resistor 26 having a lower impedance than the MOVs. This reduces the clamping voltage and allows the surge suppression network to be used with any low voltage system (100 to 600 VAC).

The surge protection network 211 has a DESD 127 providing noise and low energy surge protection. This DESD circuit 127 has positive and negative branches with the polarity determined by a diode 129 and a capacitor 131 with a bleed resistor 133 for absorbing noise and for providing a low impedance path for fast rising surges. The capacitors 131 absorb the surge energy during the first several hundred nano-seconds of the surge event and discharge once the TRIACs are fully turned on.

Figure 4A:
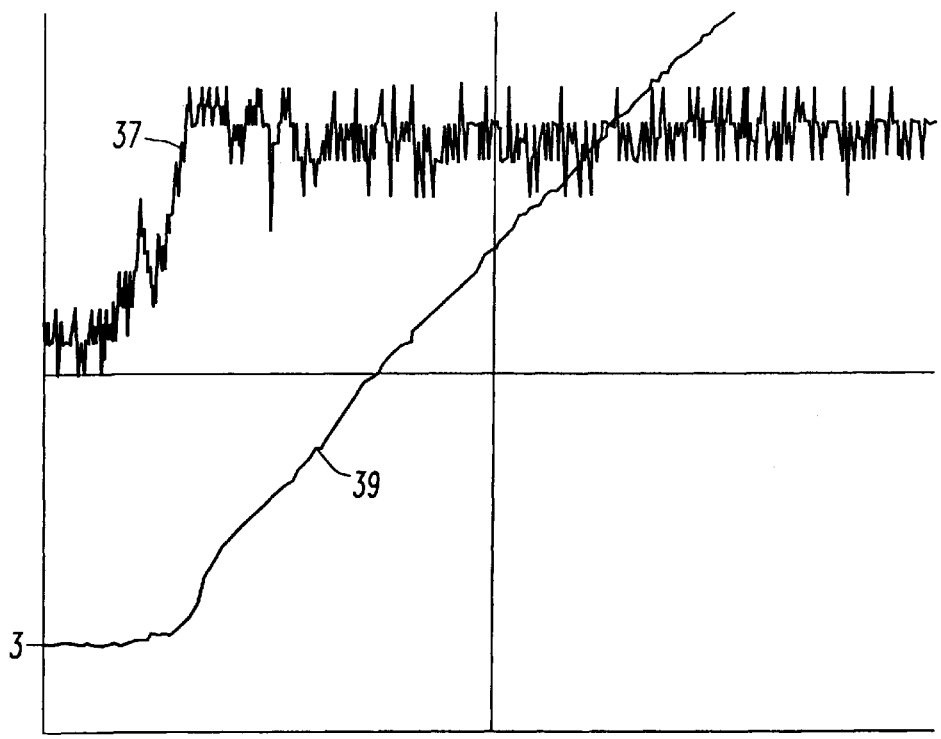
FIGS. 4A and 4B graphically illustrate the positive and negative response characteristics, respectively, of a TRIAC as used in the embodiment of FIG. 3.
Figure 4B:
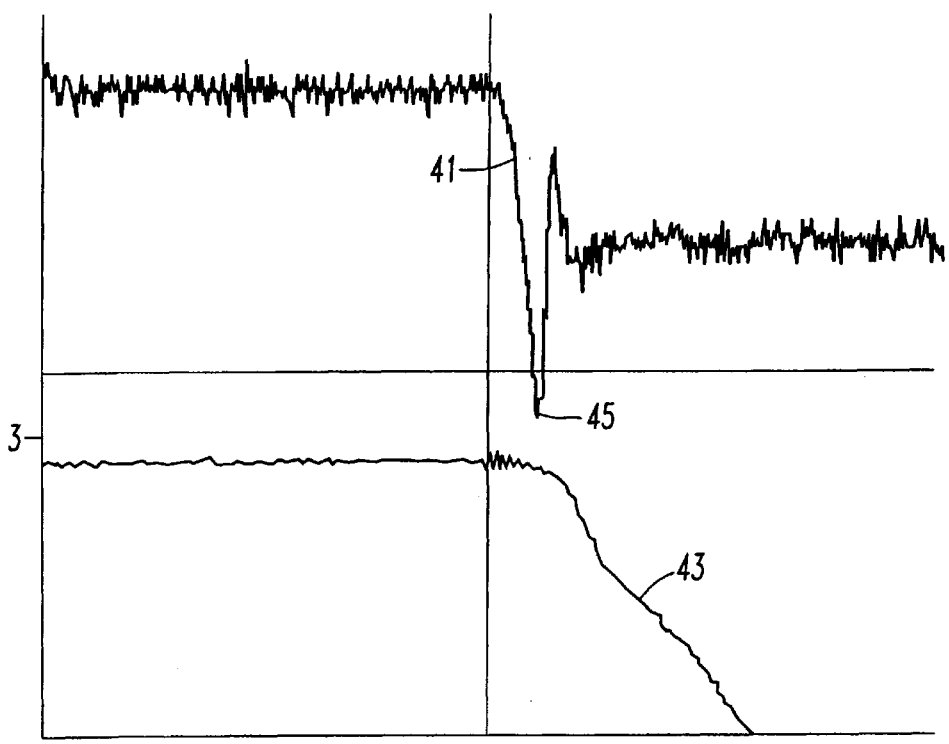

As mentioned, anti-parallel subnetworks $11_p$ and $11_n$ are used because of the internal operation of the TRIACs. The TRIACs 15 do not turn on as fast for a negative surge as they do for a positive surge. This causes a spike at the beginning of a negative surge. The difference between the positive and negative response of the TRIAC is illustrated by FIGS. 4a and 4b. In FIG. 4a, 37 illustrates the clamping voltage and the trace 39 illustrates the surge current for a positive surge. In FIG. 4b, the trace 41 is the clamping voltage and the trace 43 is the surge current for a negative surge. The large negative spike 45 is caused by the slower reaction time of the TRIAC to the negative surge.

The TRIAC can be gated in four basic gating quadrants. The TRIACs 15 of the invention are operated in quadrants I and III. The gate current and the current in the main branch (between main terminal MT2 and main terminal MT1) have the same polarity. When the main current is positive, the gate current is also positive. When the main current is negative, the gate current is also negative. Because the TRIACs 15 have different dV/dt characteristics in quadrant I compared to quadrant III, the clamping voltages for positive and negative surges are different. The quadrant I response is superior to that of quadrant III. This problem is solved in the embodiments of FIGS. 2 and 3 by providing the anti-parallel subnetworks $111_p$ and $111_n$. This arrangement allows the TRIACs 15 to respond faster and results in similar performance for positive and negative surges.

Figure 5:
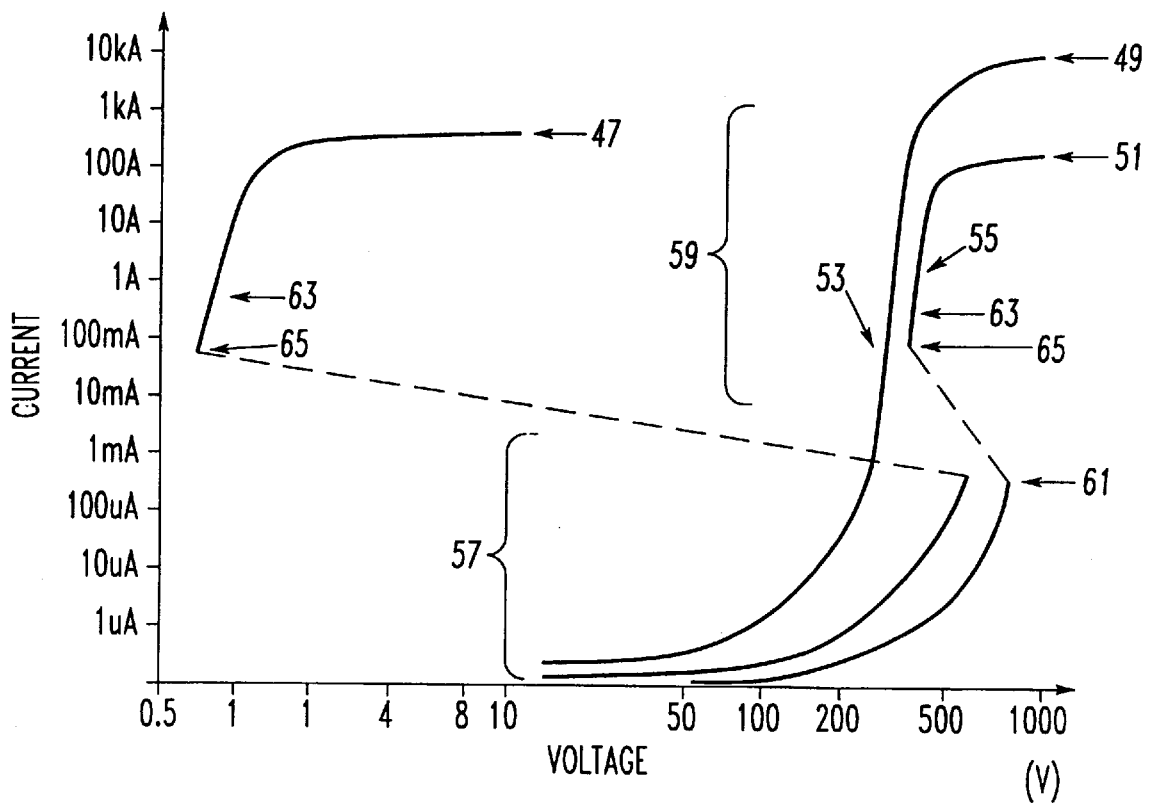
FIG. 5 illustrates the V-I characteristics in log-log scale for a crowbar device, a clamping device and the combination thereof as operated in accordance with the invention.

The voltage-current V-I characteristic of the surge suppression network of FIG. 3 is illustrated in FIG. 5. The V-I characteristic of the crowbar components 15 illustrated by the trace 47 is combined with the V-I characteristics of the clamping components 13 represented by the trace 49 to depict the V-I characteristic of the network 211 illustrated by the trace 51. The clamping voltage for the clamping devices 13 differs depending upon their MCOV rating. The V-I characteristic in FIG. 5 is illustrative of the exemplary network. If the clamping voltage of the clamping device is 240 V as illustrated at 53 then the let-through voltage for the network 211 as shown in FIG. 5 is approximately 300 V as shown at 55. Blocking voltage is the term used to describe the maximum voltage that a device will stay in the leakage current region shown at 57 before moving into the clamping voltage region as shown at 59. The blocking voltage of the surge protection network in FIG. 5 is approximately 800 V as shown at 61. This is about 200 V above the maximum nominal operation voltage to provide an operating margin. The latching current 63 and holding current 65 are similar for the crowbar device and the network.

There are several advantages that result from the V-I characteristic 51 shown in FIG. 5. They include better clamping voltage, higher surge carrying capability, system voltage independence, increased reliability and longer life expectancy.

The clamping voltage of the surge protection network in accordance with the invention depends on a number of factors. The most influential factor is the MCOV of the clamping device 13—the lower the MCOV, the better the clamping voltage. A further factor is impedance of the DESD and triggering circuits. The DESD might reduce the effect of the triggering circuit impedance and suppress the turn-on process of the crowbar devices 15. In applications where very high surge current capabilities are required, a number of crowbar devices 15 are connected in parallel along with a number of parallel clamping devices 13. When a number of clamping devices are connected in parallel, their parasitic capacitance increases. This results in low impedance during the fast rising edge of the surge and the gate current required to trigger the crowbar devices 15 increases. The larger the gate current, the better the surge current is shared among the crowbar components.

Figure 6A:
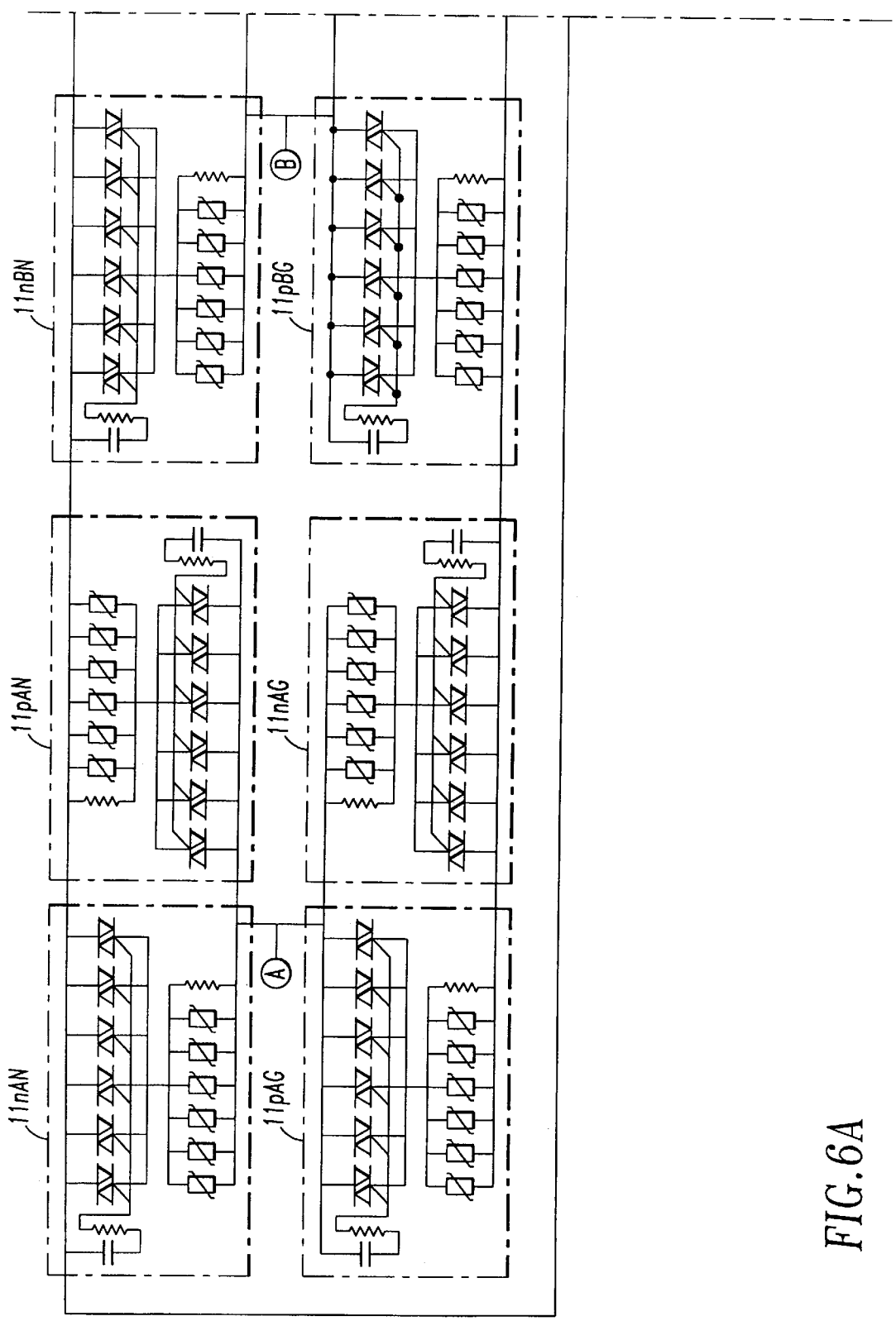
FIGS. 6A and 6B when joined end to end illustrate a schematic diagram of a three-phase system with neutral and ground incorporating the invention.
Figure 6B:
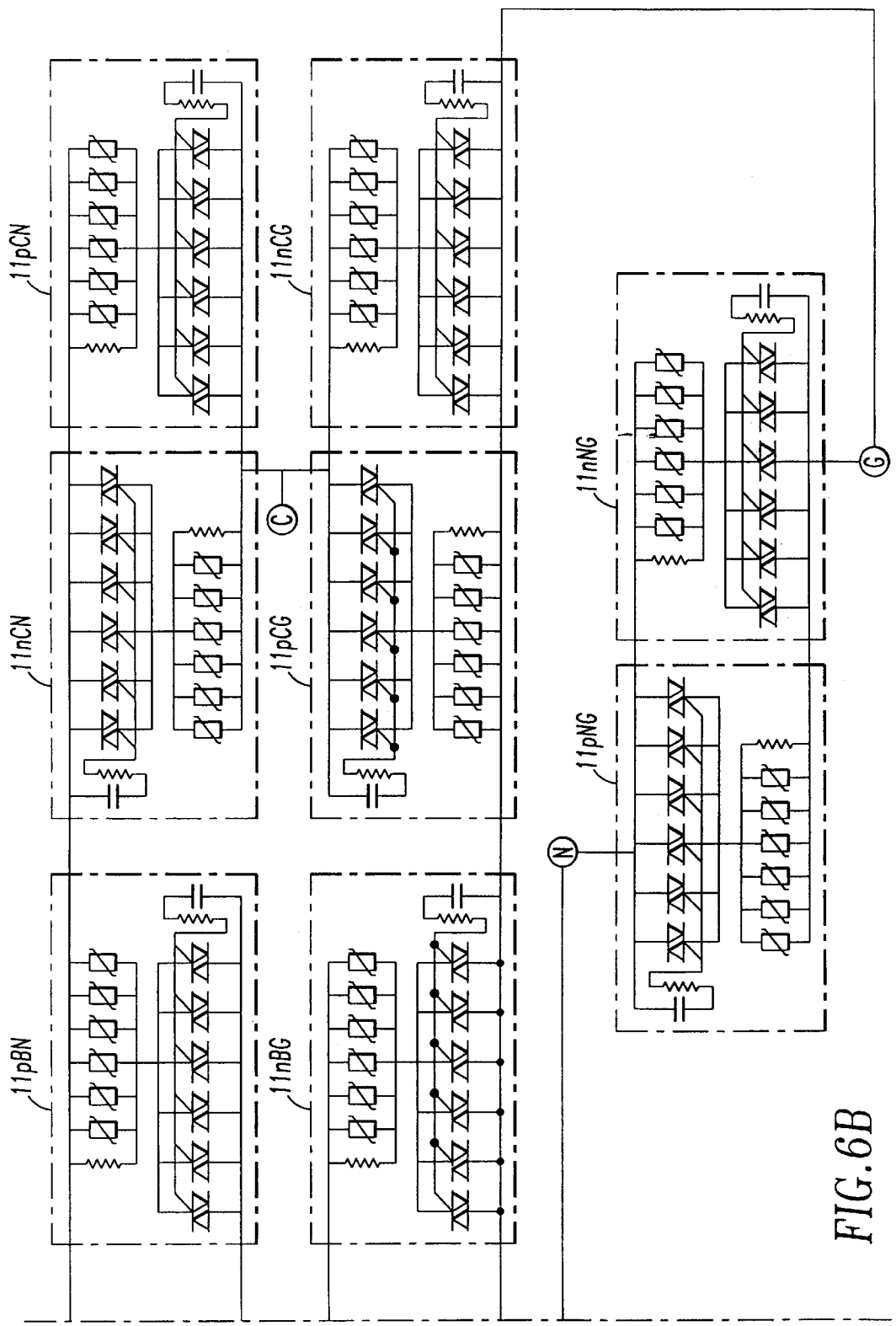

The invention can also be applied to a multiphase ac supply voltage. FIG. 6 illustrates such an application. Here, the ac system has phase A, B, and C in addition to a neutral N and a ground G. Anti-parallel subnetworks are provided between each of the phases A, B, and C and both neutral and ground. Thus, for instance, there is a positive subnetwork $11_pAN$ and a negative said network $11_nAN$ between phase A and neutral. In addition, there is a positive subnetwork $11_pAG$ and a negative subnetwork $11_nAG$ between phase A and ground. Similar sets of subnetworks are provided between each of phases B and C and neutral and between each of these phases and ground. In addition, a pair of anti-parallel subnetworks $11_pNG$ and $11_nNG$ are provided between neutral and ground.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A surge suppression network for a load supplied with ac supply voltage by ac mains, said network comprising:
    voltage clamping means for limiting voltage thereacross to a specified clamping voltage;
    crowbar means switchable from a current blocking off state to a current conducting on state in response to a trigger signal and connected in series with the voltage clamping means across said ac mains in parallel with said load;
    a shunt resistor connected in parallel with the voltage clamping means; and
    trigger means connected to said supply voltage and said crowbar means for generating said trigger signal in response only to a rate of change in amplitude of said supply voltage indicative of a specified voltage surge to switch said crowbar means to said on stage and clamp said voltage across said load to a let through voltage substantially equal to a sum of said clamping voltage of said voltage clamping means and voltage across said crowbar means in said on state.

2. The surge suppression network of claim 1 wherein said crowbar means is selected from a group comprising: a TRIAC, an SCR and a four-terminal thyristor having a gate electrode connected to said trigger means.

3. The surge suppression network of claim 2 wherein said trigger means comprises a series resistor capacitor circuit.

4. The surge suppression network of claim 1 wherein said voltage clamping device is selected from a group comprising: a metal oxide varistor, a zener diode and a silicon avalanche diode.

5. The surge suppression network of claim 1 wherein said ac supply voltage ranges over about 100 and 600 VAC and said voltage clamping means comprises a metal oxide varistor.

6. The surge suppression network of claim 1 wherein said voltage clamping means comprises a plurality of voltage clamping devices connected in parallel and said crowbar means comprises a plurality of crowbar devices connected in parallel.

7. The surge suppression network of claim 6 wherein said plurality of voltage clamping devices comprise a plurality of metal oxide varistors connected in parallel and wherein said crowbar devices comprise a plurality of TRIACS connected in parallel and all connected in series with said plurality of parallel connected metal oxides varistors.

8. The surge suppression network of claim 7 wherein said trigger means comprises a single trigger circuit providing a common trigger signal to all of said plurality of TRIACS.

9. The surge suppression network of claim 8 wherein said single trigger circuit comprises a series resistor capacitor circuit.

10. The surge suppression network of claim 1 wherein said clamping means, crowbar means and trigger means comprise multiple clamping means, crowbar means and trigger means arranged in a positive subnetwork and an anti-parallel connected negative subnetwork each having voltage clamping means, a shunt resistor connected in parallel with the voltage clamping means, crowbar means and an associated trigger means providing said trigger signal to the crowbar means of the associated subnetwork.

11. The surge suppression network of claim 10 wherein said crowbar means comprises devices selected from a group comprising a TRIAC, a silicon controlled rectifier, and a four-element thyristor.

12. The surge suppression network of claim 10 wherein said clamping means is selected from a group comprising a metal oxide varistor, a zener diode, and a silicon avalanche diode.

13. The surge suppression network of claim 10 wherein in each of said positive subnetwork and said negative subnetwork, said clamping means comprises a plurality of clamping devices connected in parallel with a common shunt resistor and said crowbar means comprises a plurality of crowbar devices connected in parallel and all connected in series with said plurality of parallel connected clamping devices.

14. The surge suppression network of claim 13 wherein each of said positive subnetwork and negative subnetwork have a single trigger means for all of said crowbar devices in the respective subnetwork.

15. The surge suppression network of claim 14 wherein said clamping devices are selected from the group consisting of a metal oxide varistor, a zener diode and a silicon avalanche diode.

16. The surge suppression network of claim 14 wherein said crowbar devices are selected from a group consisting of a TRIAC, a silicon control rectifier, and a four-terminal thyristor.

17. The surge suppression network of claim 13 including an impedance connected in series with each of said crowbar devices.

18. The surge suppression network of claim 17 wherein said impedances connected in series with said crowbar devices are fusible devices.

19. The surge suppression network of claim 11 including a noise and surge front edge suppression circuit in parallel with said positive and negative subnetworks.

20. The surge suppression network of claim 1 wherein said load, ac supply voltage, and ac mains are all multiphase, and wherein associated voltage clamping means and the shunt resistor in series with crowbar means and trigger means for said crowbar means and responsive to rate of change of voltage are provided for each of said multiphases of said supply voltage.

21. The surge suppression network of claim 20 wherein said supply voltage includes a neutral and a ground and wherein voltage clamping means in series with crowbar means and trigger means for said crowbar means and responsive to rate of change of voltage are also provided between said neutral and ground.

22. The surge suppression network of claim 20 wherein each of said voltage clamping means comprises a plurality of voltage clamping devices connected in parallel, and each of said crowbar means comprises a plurality of crowbar devices connected in parallel with each other and in series with the associated clamping devices.

23. The surge suppression network of claim 22 wherein said clamping devices are selected from a group comprising a metal oxide varistor, a zener diode and a silicon avalanche diode.

24. The surge suppression network of claim 22 wherein said crowbar devices are selected from a group comprising a TRIAC, an SCR and a four-terminal thyristor.

25. The surge suppression network of claim 22 wherein said trigger means comprises a common series resistor capacitor circuit for all of the crowbar devices associated with each of said multiphases.

26. The surge suppression network of claim 22 comprising a positive subnetwork and an anti-parallel negative subnetwork provided for each of said multiphases, each of said positive subnetworks and said negative subnetworks having clamping means, a shunt resistor connected in parallel with the clamping means, crowbar means and an associated trigger means providing said trigger signal to the crowbar means.

27. The surge suppression network of claim 26 wherein each of said clamping means comprises a plurality of clamping devices connected in parallel with a common shunt resistor and each of said crowbar means comprises a plurality of crowbar devices connected in parallel with each other and in series with the plurality of clamping devices.

28. The surge suppression network of claim 27 wherein each of said positive subnetwork and negative subnetwork have a single trigger means for all of said crowbar devices in the respective subnetwork.

* * * * *